US012468597B2

(12) United States Patent
Lanka et al.

(10) Patent No.: US 12,468,597 B2
(45) Date of Patent: Nov. 11, 2025

(54) VALID SIGNAL FOR LATENCY SENSITIVE DIE-TO-DIE (D2D) INTERCONNECTS

(71) Applicant: Intel Corporation, Santa Clara, CA (US)

(72) Inventors: Narasimha Lanka, Dublin, CA (US); Debendra Das Sharma, Saratoga, CA (US); Lakshmipriya Seshan, Sunnyvale, CA (US); Swadesh Choudhary, Mountain View, CA (US); Zuoguo Wu, San Jose, CA (US); Gerald Pasdast, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 17/733,627

(22) Filed: Apr. 29, 2022

(65) Prior Publication Data

US 2022/0261308 A1    Aug. 18, 2022

Related U.S. Application Data

(60) Provisional application No. 63/295,183, filed on Dec. 30, 2021.

(30) Foreign Application Priority Data

Jan. 27, 2022    (IN) .............................. 202241004437

(51) Int. Cl.
*G06F 11/10*    (2006.01)
*G06F 11/07*    (2006.01)
(Continued)

(52) U.S. Cl.
CPC ...... *G06F 11/1004* (2013.01); *G06F 11/0772* (2013.01); *G06F 13/4068* (2013.01);
(Continued)

(58) Field of Classification Search
CPC ............. G06F 11/1004; G06F 11/0772; G06F 13/4068; H01L 23/49816; H01L 23/49833;
(Continued)

(56) References Cited

U.S. PATENT DOCUMENTS

| 10,073,808 B2 | 9/2018 | Wu et al. |
| 2015/0032917 A1 | 1/2015 | Nguyen |

(Continued)

FOREIGN PATENT DOCUMENTS

| JP | 2017506010 A | 2/2017 |
| JP | 2021061469 A | 4/2021 |

OTHER PUBLICATIONS

Ardalan et al., Bunch of Wires: An Open Die-to-Die Interface, 2020, IEEE, pp. 9-16 (Year: 2020).*

(Continued)

*Primary Examiner* — John J Tabone, Jr.
(74) *Attorney, Agent, or Firm* — Schwabe, Williamson & Wyatt, P.C.

(57) ABSTRACT

Embodiments herein relate to a die of a multi-die package, wherein the die is coupled with another die via a die-to-die (D2D) interconnect link. The die may transmit a data signal to the other die via a data lane of the D2D interconnect link. The die may further transmit, concurrently with the data signal, a valid signal to the other die via a valid lane of the D2D interconnect link. The valid signal may change logical state at least once during the transmission of the data signal. Other embodiments may be described and claimed.

21 Claims, 7 Drawing Sheets

(51) Int. Cl.
*G06F 13/40* (2006.01)
*H01L 23/00* (2006.01)
*H01L 23/498* (2006.01)
*H01L 23/538* (2006.01)
*H01L 23/66* (2006.01)
*H01L 25/065* (2023.01)
*H01L 25/18* (2023.01)

(52) U.S. Cl.
CPC .. *H01L 23/49816* (2013.01); *H01L 23/49833* (2013.01); *H01L 23/5381* (2013.01); *H01L 23/5383* (2013.01); *H01L 23/5385* (2013.01); *H01L 23/5386* (2013.01); *H01L 23/66* (2013.01); *H01L 24/16* (2013.01); *H01L 25/0655* (2013.01); *H01L 25/18* (2013.01); *H01L 2224/16225* (2013.01); *H01L 2924/1431* (2013.01)

(58) Field of Classification Search
CPC ............. H01L 23/5381; H01L 23/5383; H01L 23/5385; H01L 23/5386; H01L 23/66; H01L 24/16; H01L 25/0655; H01L 25/18; H01L 2224/16225; H01L 2924/1431
See application file for complete search history.

(56) References Cited

U.S. PATENT DOCUMENTS

| | | | |
|---|---|---|---|
| 2016/0283429 A1* | 9/2016 | Wagh | G06F 13/4022 |
| 2016/0285624 A1* | 9/2016 | Wagh | H04B 3/46 |
| 2017/0083475 A1* | 3/2017 | Wu | G06F 1/10 |
| 2017/0351640 A1* | 12/2017 | Nilange | G06F 13/4291 |
| 2018/0095923 A1* | 4/2018 | Iyer | G06F 13/4022 |
| 2018/0095925 A1* | 4/2018 | Iyer | G06F 13/4265 |
| 2018/0196710 A1* | 7/2018 | Iyer | H04L 1/0045 |
| 2018/0276164 A1* | 9/2018 | Das Sharma | H01L 25/0655 |
| 2019/0227972 A1* | 7/2019 | Hor | G06F 13/387 |
| 2019/0238179 A1* | 8/2019 | Iyer | G06F 13/20 |
| 2020/0042471 A1 | 2/2020 | Kerr et al. | |
| 2020/0244397 A1* | 7/2020 | Iyer | H04L 1/0061 |
| 2020/0356436 A1* | 11/2020 | Iyer | G06F 11/1004 |
| 2022/0261308 A1* | 8/2022 | Lanka | G06F 11/0772 |

OTHER PUBLICATIONS

International Search Report and Written Opinion mailed Apr. 5, 2023 for International Application No. PCT/US2022/051154, 11 pages.
International Preliminary Report on Patentability mailed Jul. 11, 2024 for International Application No. PCT/US2022/051154, 7 pages.

* cited by examiner

VALID SIGNAL FOR LATENCY SENSITIVE DIE-TO-DIE (D2D) INTERCONNECTS

CROSS-REFERENCE TO RELATED APPLICATIONS

The present application claims priority to U.S. Provisional Patent Application No. 63/295,183, filed on Dec. 30, 2021, and titled "BASIC AND ENHANCED VALID FRAMING TECHNIQUES FOR LATENCY SENSITIVE DIE-TO-DIE (D2D) INTERCONNECTS," and India Provisional Patent Application No. 202241004437, filed Jan. 27, 2022, entitled "ON-PACKAGE DIE-TO-DIE (D2D) RETIMER," the entire contents of which are hereby incorporated by reference herein in their entirety.

BACKGROUND

Multi-chip packaging may refer to the presence of multiple chips or die in a single package. Multichip packaging may refer to a technology that enables performance growth in creation of complex products. Generally, multichip packages may need to operate a low error rates to meet stringent system failure and time requirements. The required low bit error rate and stringent requirements may allow for die disaggregation by allowing multiple separate die on a single package to operate like a single die. Generally, error correction techniques such as cyclic redundancy check (CRC) and retry may allow for a relaxed bit error rate, while still meeting system requirements, thereby allowing links to operate a faster data rates and improve system performance.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments described herein may include apparatus, systems, techniques, or processes that are directed to use of a valid signal for latency sensitive D2D interconnects. Specifically, the D2D interconnect may include a clock line, a data line, and a valid line, which may respectively carry a clock signal, a data signal, and a valid signal. The valid signal may be used to identify boundaries of the data signal, thereby allowing for proper data transmission during functional traffic (i.e. when there is data to send over the data line), or clock gating when the data line is idle. Embodiments may further relate to use of a pattern for the valid signal that allows for detection of valid errors. Finally, embodiments may relate to use of the valid signal to carry data.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

As noted, in a multichip package, error correction techniques such as CRC and retry may allow for a relaxed bit error rate, while still meeting system requirements, thereby allowing links to operate a faster data rates and improve system performance. In some embodiments, the latency of the CRC or retry process may determine the size of retry buffers on one or more of the die of the package. As such, it may be desirable to reduce this latency such that the retry buffers may be made smaller, thereby conserving resources in terms of size, cost, and power consumption.

Additionally, on package systems may be considered to be a power sensitive. Clock gating may be one technique by which power consumed during an idle state (i.e. when there is no data transmitted on the data line) may be reduced. Accurately framing data (that is, identifying the boundaries of data transmission) may be a necessary component of clock gating.

As previously noted, embodiments herein may relate to use of a valid signal to accomplish one or more of these goals. Specifically, the valid signal may be used to frame the data signal, and/or identify when there are errors and data transmission. Additionally, the valid signal may be useful in reducing round-trip latency in time critical messages such as error indication, power state entry or exit, etc.

As a result of one or more of these features, embodiments may provide for various advantages. Specifically, embodiments may allow for lower package power consumption due to effective clock gating. Embodiments may additionally allow for smaller retry buffers, which may provide for lower power and/or area requirements on the package. Additionally, embodiments may allow for lower entry or exit latencies to or from different powers states. Other advantages may additionally or alternatively be present.

Figure 1A:
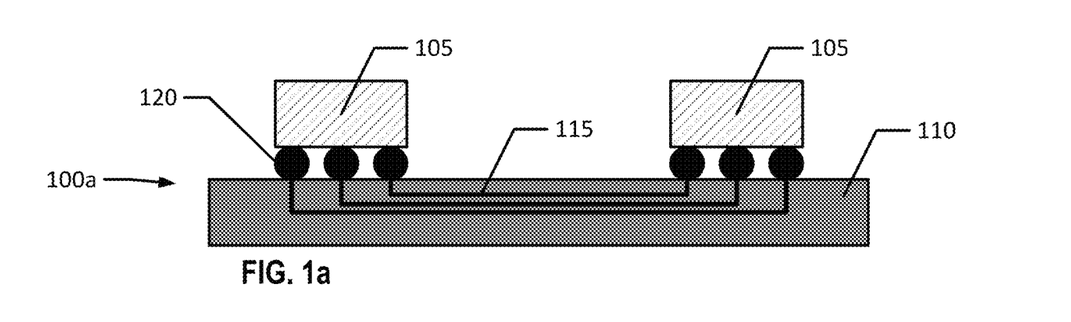
FIGS. 1a, 1b, and 1c illustrate various packages that may include die-to-die (D2D) interconnects, in accordance with various embodiments.
Figure 1B:
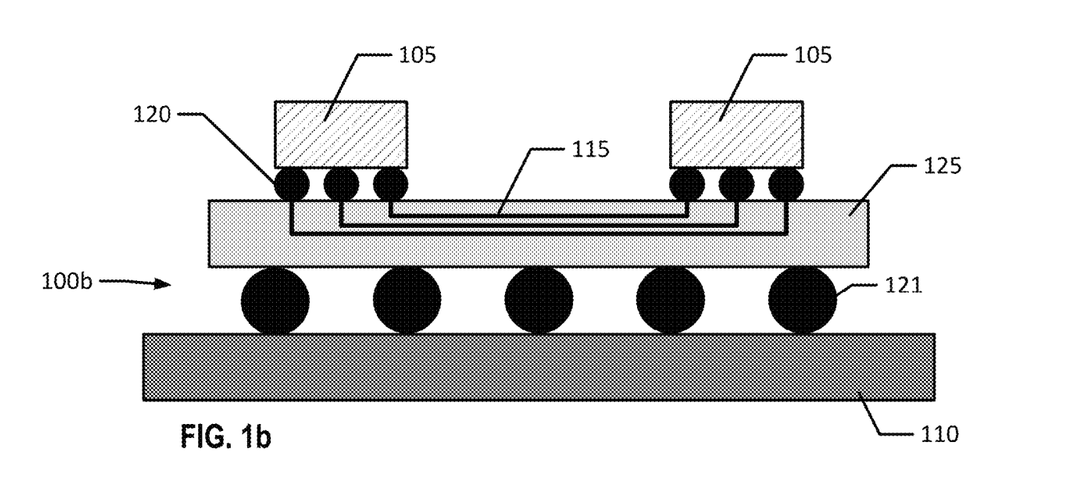
Figure 1C:
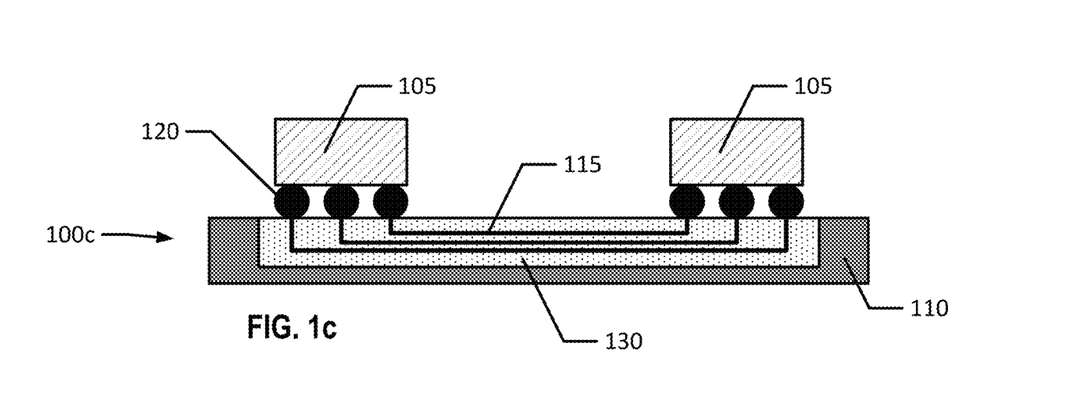

FIGS. 1a, 1b, and 1c (collectively "FIG. 1") illustrate various packages that may include die-to-die (D2D) interconnects, in accordance with various embodiments.

Specifically, FIG. 1a depicts an example package 100a that may include a plurality of dies 105. The dies may be, be related to, or include, for example, a processor, a multi-core processor, a memory, a retimer, and/or some other element. In some embodiments both dies 105 on a package may be the same type of element (e.g. both dies 105 may be processors), while in other embodiments the dies 105 may be of different types from one another. The dies 105 may be coupled with a package substrate 110 by a plurality of interconnects 120. The package substrate 110 may be, for example, a printed circuit board, a motherboard, or some other type substrate. The interconnects 120 may be, for example bumps of a ball grid array, pins of a pin grid array, or some other type of interconnect. The dies 105 may be communicatively coupled by one or more conductive element 115. The conductive elements 115 may be, include, or be part of, for example, micro-strips, strip lines, traces, vias, or some other type of conductive element.

In embodiments, one or more of the conductive elements 115 may be a part of a D2D interconnect link. The D2D interconnect link may include a clock lane, a valid lane, and a cluster of data lanes. Specifically, in some embodiments, such as the embodiment of FIG. 1a, the cluster of data lanes may include 16 data lanes on which data may be transmitted. In some embodiments, such as the embodiments of FIG. 1b or 1c the cluster of data lanes may include 64 data lanes on which data may be transmitted. In some embodiments, the "cluster" of data lanes may additionally or alternatively be referred to as a "module."

In some embodiments, different ones of the lanes of the D2D interconnect may be on different ones of the conductive elements 115. In other embodiments, one or more of the lanes of the D2D interconnect may be on a same one of the conductive elements 115 (for example, multiplexed onto a same conductive element 115).

FIG. 1b illustrates an alternative example package 100b. The package 100b may include various elements similar to those of package 100a, and their description will not be reiterated here for the sake of conciseness and clarity. The package 100 be may include and interposer 125 that is coupled with the package substrate 110 by a plurality of interconnects 121. The dies 105 may be coupled with the interposer 125 by interconnects 120. The interposer 125 may be a substrate such as package substrate 110, while in other embodiments the interposer 125 may be or include a different type of substrate. Generally, the interposer 125 may be a substrate configured to couple with dies 105 it a pitch smaller than that of a pitch of the package substrate 110. In some embodiments, the interposer 125 may be referred to as a chip on wafer on substrate (CoWoS) structure. In some embodiments, the interconnects 120 may be of the same type as interconnects 121 (for example, the may both be elements of a ball grid array or a pin grid array), while in other embodiments the interconnects 120 may be of a different form than interconnects 121.

FIG. 1c illustrates an alternative example package 100c. The package 100c may include various elements similar to those of package 100a, and their description will not be reiterated here for the sake of conciseness and clarity. The package may include a bridge 130 positioned in the package substrate 110. In some embodiments, the bridge 130 may be a silicon bridge. In this embodiment, the conductive elements 115 may be at least partially routed through the bridge 130. Generally, the bridge 130 may include a plurality of routing layers, allowing for multiple connections between various dies of a package to be communicatively coupled.

It will be understood that the various embodiments depicted in FIG. 1 are intended as high level example embodiments for the sake of discussion herein. The specific size, or relative sizes, of various elements are intended for illustration and discussion, rather than indicating real-world physical proportions. Additionally, the number of elements, for example the number of dies 105, interconnects 120, or conductive elements 115, may vary in different embodiments as well. Additionally, different embodiments may be combined. For example, in some embodiments a bridge 130 may be present in an interposer 125.

Figure 2:
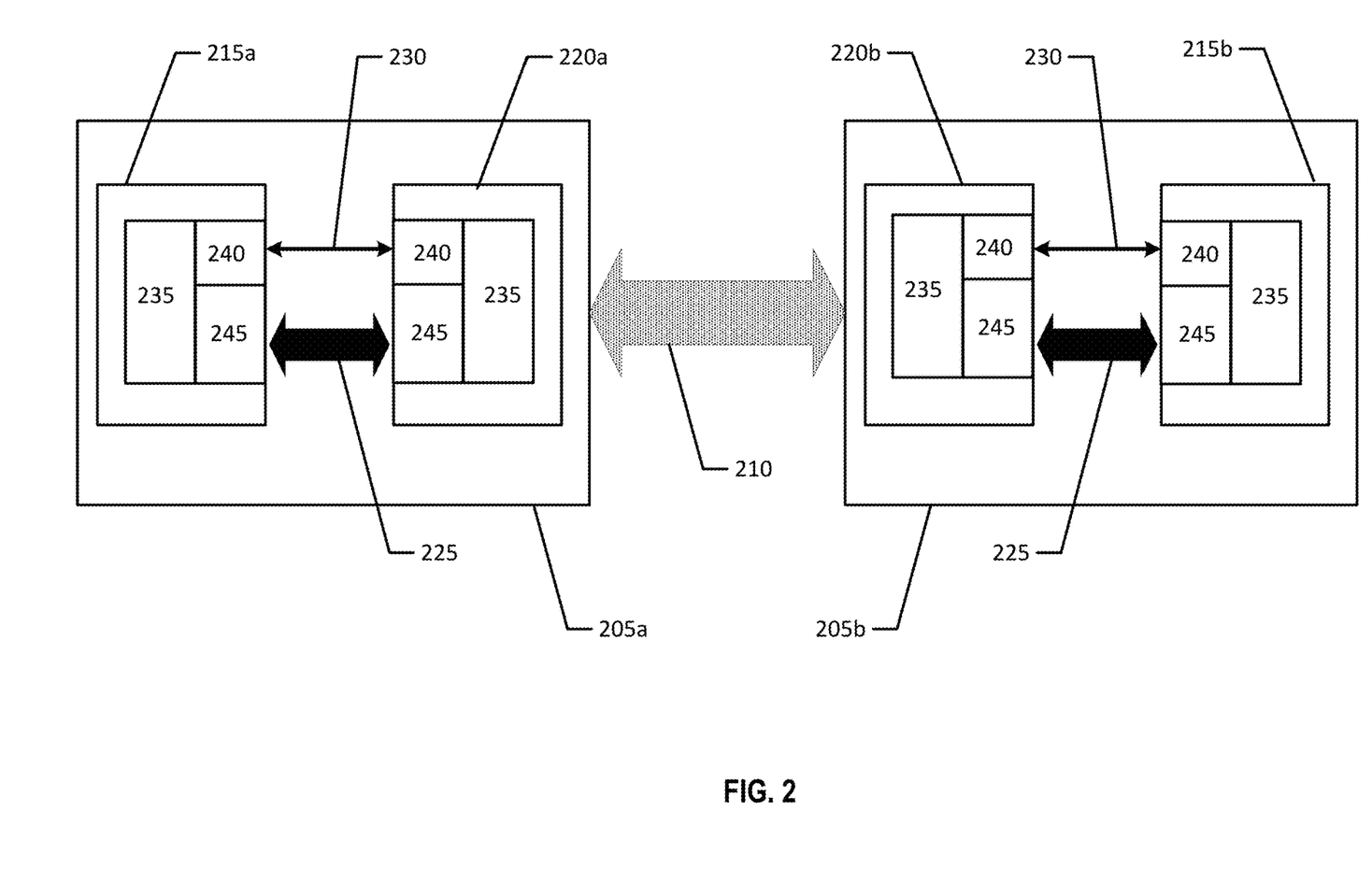
FIG. 2 illustrates example communication pathways between packages that may include D2D interconnects, in accordance with various embodiments.

FIG. 2 illustrates example communication pathways between packages that may include D2D interconnects, in accordance with various embodiments. Specifically, FIG. 2 depicts to packages 205a and 205b, which may be respectively similar to one of packages 100a, 100b, 100c, or some other package described with reference to FIG. 1. Package 205a may include die 215a and die 220a. Similarly, package 205b may include die 215b and die 220b. Dies 215a, 215b, 220a, and 220b may be similar to one of dies 105 described above. In some embodiments, dies 215a and 215b may be a die such as a processor, a memory, or some other type of die. Dies 220a and 220b may be a retimer.

For the sake of discussion herein, a retimer may be a die that is configured to receive a signal between a die on a same package and a die on another package, identify data and clock information of that signal, and then retransmit the signal as appropriate. For example, retimer 220*a* may receive a data signal from package 205*b* across interconnect 210. Transmission across interconnect 210 may insert noise and/or errors into the signal. The retimer 220*a* may be configured to identify data and clock information of the signal, remove noise or errors from one or both of the clock information and the data, and then retransmit the signal to die 215*a*. Specifically, the retimer 220*a* may be communicatively coupled with die 215*a* by a mainband 225 and a sideband 230 of a D2D interconnect link. That is, the interconnect link may be referred to as a D2D interconnect link that includes the mainband 225 and the sideband 230.

In some embodiments, the interconnect link formed of the mainband 225 and the sideband 230 may be an interconnect link in accordance with a protocol that is different from that of interconnect link 210. It will be noted that, although discussion herein is provided in the context of retransmission of data from package 205*b* to die 215*a*, in some embodiments the retimer 220*a* may also be configured to retransmit a signal from die 215*a* to package 205*b*. Additionally, in some embodiments the retimer 220*a* may be configured to perform some form of error correction or validation on signals received via interconnect 210 or mainband 225. For example, in some embodiments the retimer 220*a* may be configured to perform one or more of forward error correction (FEC), cyclic redundancy check (CRC), data acknowledgement, or some other error correction.

As used herein, the mainband 225 may be a connection that constitutes a main data path of the D2D interconnect. The mainband may include a forwarded clock lane, a valid lane, and N lanes of data per link. In some embodiments, e.g., packages 100*b* or 100*c*, N may be 64. In some embodiments, e.g., package 100*a*, N may be 16. It will be noted that in some embodiments, additional lanes (e.g., a second valid lane, a second clock lane, etc.) may be present.

The sideband 230 may be a data interface that provides a back-channel for link training. The sideband 230 may additionally allow for access of registers of a link partner (e.g., access by retimer 220*a* to a register of die 215*a*, or vice-versa). The sideband 230 may consist of a forwarded clock lane and a data lane in each direction, and may have a fixed clock speed (e.g., a clock speed on the order of 800 megahertz (MHz)) regardless of a speed of the mainband 225.

The dies 215*a*/215*b* and retimers 220*a*/220*b* may include physical layer (PHY) components such as sideband PHY layer circuitry 240, mainband PHY layer circuitry 245, and PHY layer logic 235 configured to transmit or receive various signals over the mainband 225 and sideband 230 of the D2D interconnect. The mainband PHY layer circuitry 245 and/or sideband PHY layer circuitry 240 may include electrical circuitry such as an analog front end (AFE) and be configured to transmit or receive one or more data signals over the mainband 225 and sideband 230, respectively. Specifically, the mainband PHY layer circuitry 245 may transmit and/or receive data signals over the cluster of data lanes, the valid lane, and the forwarded clock lane as described above. The sideband PHY layer circuitry 240 may transmit and/or receive sideband signals over the sideband 230, as described above. In some embodiments, the circuitry 240/245 may perform additional functions such as clocking, first-in-first-out (FIFO) buffering, serializing/deserializing (SERDES) of signals, etc.

The PHY layer logic 235 may be configured to control operation of the circuitry 240/245, and perform data processing/transfer between the circuitry 240/245 and an interface such as a D2D interface (not shown). Specifically, the logic 235 may perform actions such as link training, lane repair, lane reversal scrambling/de-scrambling, etc. of one or both of the mainband 225 and sideband 230.

It will be noted that, although only single instances of circuitry 240/245 or logic 235 are depicted on respective dies 215*a*/215*b* or retimers 220*a*/220*b*, in other embodiments a die or retimer may have multiple PHY layer logics 235, each with a respective mainband circuitry 245 and sideband circuitry 240. Likewise, a die such as die 215*a* may be coupled with a plurality of other dies via respective mainbands and/or sidebands, or two dies may be coupled with multiple mainbands and/or sidebands. The particular configuration of these couplings may be based on the use case to which the various packages will be put.

Figure 3:
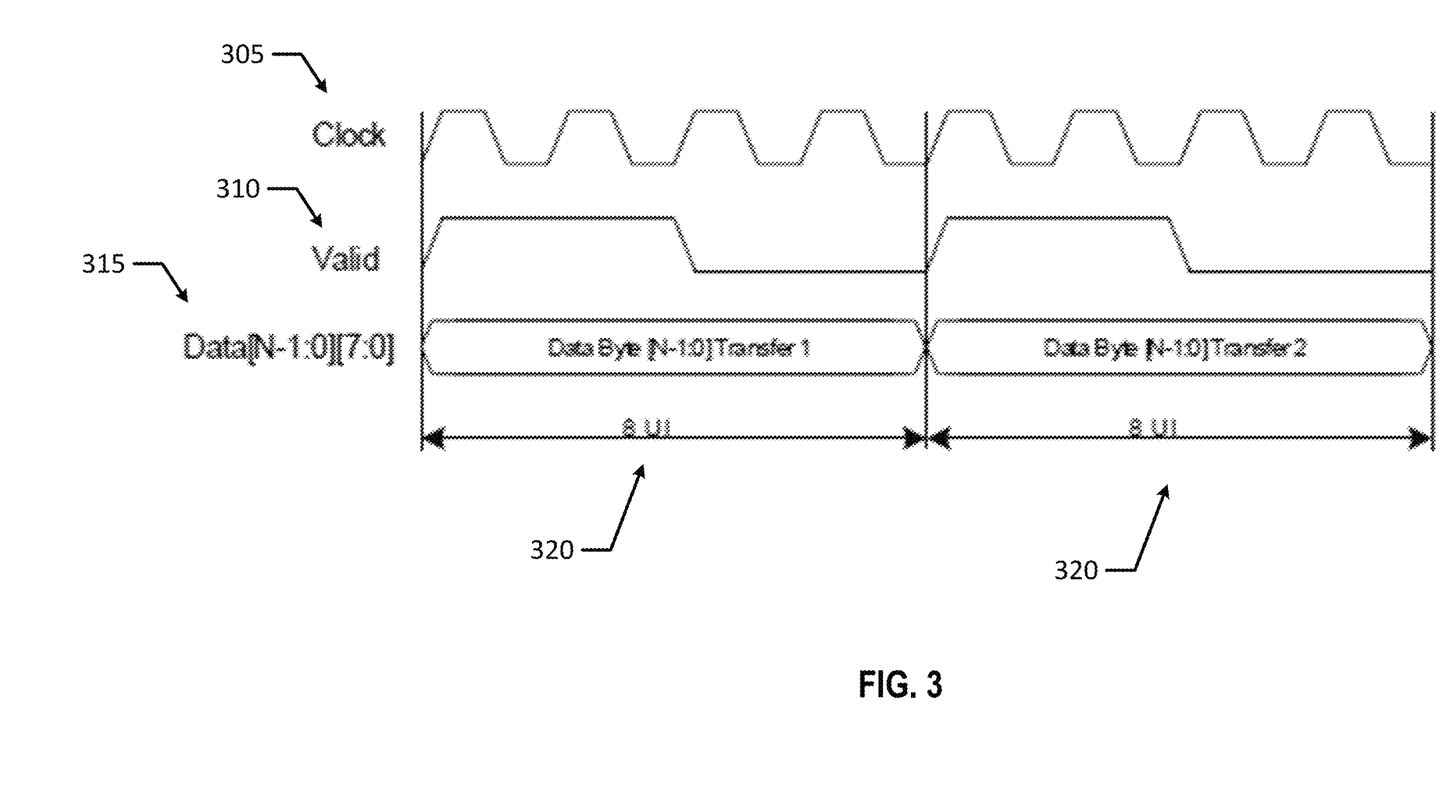
FIG. 3 illustrates an example timing diagram of signals in a D2D interconnect, in accordance with various embodiments.

FIG. 3 illustrates an example timing diagram of signals in a D2D interconnect, in accordance with various embodiments. Specifically, FIG. 3 illustrates an example timing diagram of signals and a mainband of a D2D interconnect such as mainband 225. As noted, the mainband 225 may include a clock lane 305, a valid lane 310, and a data lane 315. Signals on the data lane 315 may be in the form of bytes of data in an 8-unit interval (UI) data signal 320. Respective ones of the bytes of data in the 8-UI data signal 320 may include 8 bits, and each bit may be transmitted on an individual UI. Generally, each UI may correspond to an oscillation of the clock lane 305. That is, a first UI may correspond to a high signal on the clock lane 305, a second UI may correspond to a low signal on the clock lane 305, etc.

Figure 4:
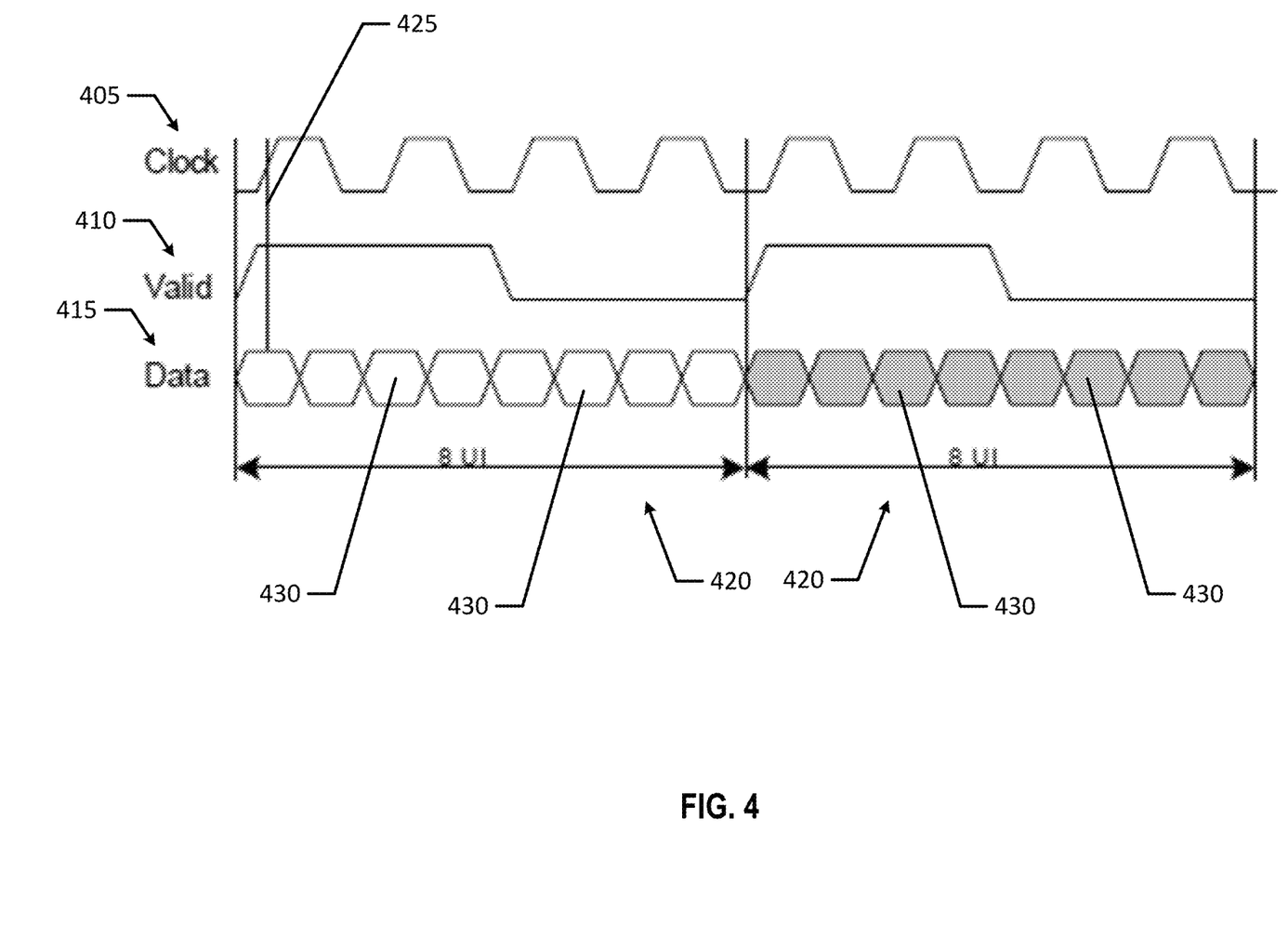
FIG. 4 illustrates an alternative example timing diagram of signals in a D2D interconnect, in accordance with various embodiments.

FIG. 4 illustrates an alternative example timing diagram of signals in a D2D interconnect, in accordance with various embodiments. Specifically, FIG. 4 illustrates an example timing diagram of signals and a mainband of a D2D interconnect such as mainband 225. The mainband may include a clock lane 405, a valid lane 410, and a data lane 415, which may be respectively similar to clock lane 305, valid lane 310, and data lane 315. Bytes of data may be transmitted in a data signal 420 on the data lane 415, which may be similar to the data signal 320 described above. Specifically, as noted, each data signal 420 may include eight bits 430, transmitted on a respective UI of the 8-UI data signal 420. Each bit 430 may correspond to a rising or falling edge of the clock signal on the clock lane 405, as indicated by line 425.

Figure 5:
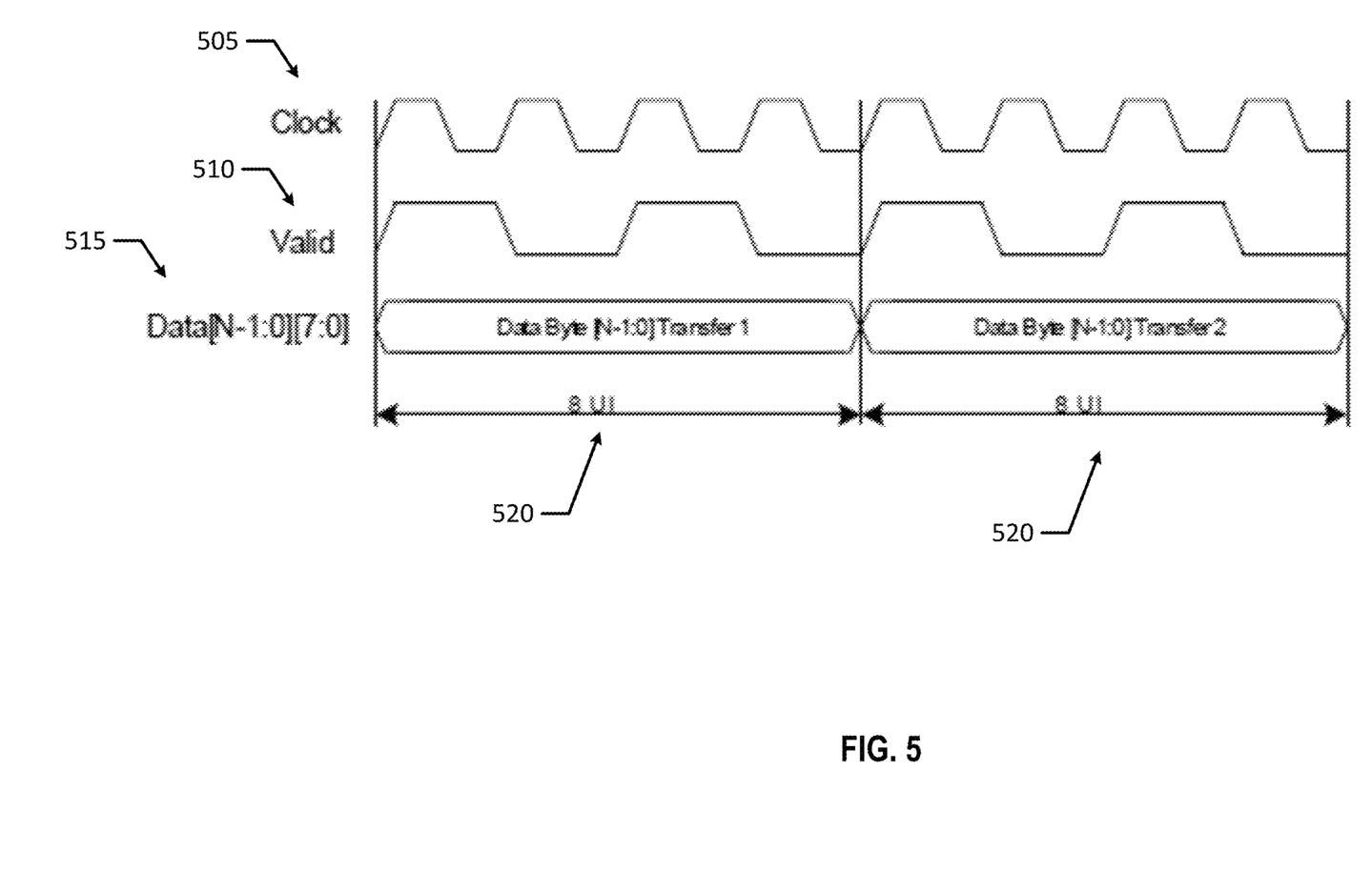
FIG. 5 illustrates an alternative example timing diagram of signals in a D2D interconnect, in accordance with various embodiments.

FIG. 5 illustrates an alternative example timing diagram of signals in a D2D interconnect, in accordance with various embodiments. FIG. 5 may be generally similar to FIG. 3. Specifically, FIG. 5 may include a clock lane 505, a valid lane 510, and a data lane 515 to transmit bytes of data in a data signal 520, which may be respectively similar to elements 305, 310, 315, and 320. As may be seen with respect to FIG. 5, and in comparison to FIG. 3, the valid signal on the valid lane 510 may switch more often than every 4 UI. For example, in FIG. 5, the valid signal on the valid lane 510 may switch state every 2 UI. In some embodiments, the switching of the valid signal may indicate data being transferred on the valid lane 510. As will be described further below, such data may be latency sensitive data for which the sideband 230 may not be adequate.

Returning to FIG. 3 for the sake of discussion of embodiments herein (although such discussions may similarly apply to the embodiments of FIGS. 4 and/or 5), one purpose of the valid signal on the valid lane 310 may be to frame the data signal 320. That is, as may be seen in FIG. 3, the valid signal on the valid lane 310 may be asserted (e.g., set to a "high" state which may correspond to a logical value of "1") for 4 UI, and then de-asserted (e.g., set to a "low" state which may correspond to a logical value of "0") for 4 UI. By tracking the oscillation of the valid signal on the valid lane 310, a receiver may be able to identify a beginning and end of the data signal 320 on the data lane 315. In this way, the specific protocol by which the data signal is transmitted on the data lane 315 may not need to be known by the receiver, and so various modes (e.g., a mode in accordance with a protocol of interconnect 210, a flit mode, or some other mode) may be supported.

In some embodiments, the valid lane 310 may operate in one of two modes. Such modes may be referred to herein as a "basic" mode and an "enhanced" mode.

In the basic mode, a receiver may look for a transition of the valid signal from one state to another (for example, from a low state to a high state, or a logical "0" to a logical "1") at the boundary of every 8 UIs (e.g., at the boundary of the data signal 320). A valid-signal framing error may be detected by counting the number of UIs in which the valid signal is in either state within the eight UI boundary. A combination of transition and counts of UIs in a specific state (for example a logical "1") may be used to detect valid-signal framing errors. Specifically, the number of UIs that the valid signal is in the first state should be equal to the number of UIs that the valid signal is in the second state within the eight UI boundary. If the number of UIs that the valid signal is in the first state is not the same as the number of UIs that the valid signal is in the second state, then this may indicate a framing error in which the valid signal is not aligned with 8-UI data signal 320.

In the enhanced mode, the valid signal on the valid lane 310 may include additional data beyond framing the data signal of the data lane 315. Specifically, the receiver of the mainband interconnect link may identify the data byte based on a transition from one state to another state (e.g., a low state to a high state or a logical "0" to a logical "1") as described above. The receiver may additionally identify in which UIs the valid signal is in the first state and the second state. The UIs may be numbered as b0-b7. The UIs b0, b2, b4, and b6 may be identified as "even" UIs, and the UIs b1, b3, b5, and b7 may be identified as "odd" UIs. If the number of UIs that the valid signal is in one state (e.g., the high or logical "1" state) for even UIs is the same as the number of UIs that the valid signal is in that state for odd UIs, then the receiver may identify that the valid signal is framing the data signal 320 correctly. If the number of UIs that the valid signal is in that state for even UIs is different than the number of UIs that the valid signal is in that state for odd UIs, then the receiver may identify that a framing error exists. Table 1 indicates possible values for the valid signal operating in enhanced mode for UIs b0-b7:

TABLE 1

| b0 | b1 | b2 | b3 | b4 | b5 | b6 | b7 |
|----|----|----|----|----|----|----|----|
| 1  | 1  | 0  | 0  | 0  | 0  | 0  | 0  |
| 1  | 0  | 0  | 1  | 0  | 0  | 0  | 0  |
| 1  | 0  | 0  | 0  | 0  | 1  | 0  | 0  |
| 1  | 1  | 1  | 1  | 0  | 0  | 0  | 0  |
| 1  | 1  | 1  | 0  | 0  | 1  | 0  | 0  |
| 1  | 1  | 0  | 1  | 1  | 0  | 0  | 0  |
| 1  | 1  | 0  | 1  | 0  | 0  | 1  | 0  |
| 1  | 1  | 0  | 0  | 1  | 1  | 0  | 0  |
| 1  | 1  | 0  | 0  | 0  | 1  | 1  | 0  |
| 1  | 1  | 1  | 1  | 1  | 1  | 0  | 0  |
| 1  | 1  | 1  | 1  | 0  | 1  | 1  | 0  |

As may be seen, a variety of values may be possible. FIGS. 3 and 4, for example, may depict a valid signal with the values "1 1 1 1 0 0 0 0." FIG. 5, for example, may depict a valid signal with the values "1 1 0 0 1 1 0 0."

In some embodiments, the data encoded in the valid signal may be related to latency-sensitive data being transmitted between two dies of a package. Specifically, such data may not be able to be transmitted on the data lane 315 due to the presence of existing data on that lane, but the latency of the relatively slower sideband of the interconnect link may introduce undesirable latency to the data. Such data may relate to, for example error acknowledgement/non-acknowledgement (ACK/NACK) or some other type of data.

Specifically, in some embodiments may relate to credit release and/or error ACK/NACK of a retimer such as retimers 220a or 220b. For example, a retimer such as retimer 220a may be configured to transmit an ACK/NACK signal to a die 215a using the valid lane of the main band 225. The ACK/NACK signal may indicate to the die 215a whether the retimer 220a successfully received and decoded data from the die 215a (ACK) or did not receive and successfully decode data from the die 215a (NACK). Additionally or alternatively, the signal on the valid lane of the main band 225 may relate to a credit release. As used herein, a credit release may refer to an indication by the retimer 220a that the retimer 220a has the capability to receive additional data from the die 215a. Table 2, below, indicates possible encodings that may be used for signaling ACK/NACK and/or credit release on the valid lane. It will be noted that some encodings of Table 2 may overlap with the encodings depicted with respect to Table 1. Additionally, it will be understood that such encodings are intended as non-exhaustive examples, and additional/alternative encodings may be present in other embodiments.

TABLE 2

| 8-UI encoding | Meaning |
|---|---|
| 11111111 | Flit data transfer valid + 1 credit release |
| 11110000 | Flit data transfer valid + no credit release |
| 00001111 | No flit data transfer + 1 credit release |
| 00000000 | No flit data transfer + no credit release |

By allowing the ACK/NACK and/or credit release information to be transmitted with lower latency, the retimer, and specifically one or more buffers of the retimer, may be made smaller because the buffer may not be required to store as much data as may otherwise be present if the data ACK/NACK had increased latency. Reducing the size of the buffer may result in cost and/or space savings of the overall package. In other embodiments, the data on the valid signal may relate to power management entry/exit messages relate to one or both of the die on the package, or some other latency-sensitive message.

In some embodiments, if fewer numbers of encoding are required, the choice can be made based on Hamming distance to provide additional valid error protection. Specifically, a number of encoding may be seen in Tables 1 or 2. If all of the encodings in Tables 1 and/or 2 are not needed for information exchange purposes, then a subset (e.g., fewer) of those encodings may be used in various embodiments. One way to choose which encodings to use or exclude may be to maximize the Hamming distance between the various selected encodings. As used herein, the Hamming distance may refer to the number of differences between corresponding UIs (e.g., if one encoding has a value of "1" at UI 0 and the other encoding has a value of "0" at UI 0) between any two encodings. It will be understood that other embodiments may use different techniques, algorithms, and/or processes for identifying or selecting the subset of encodings to be used.

Figure 6:
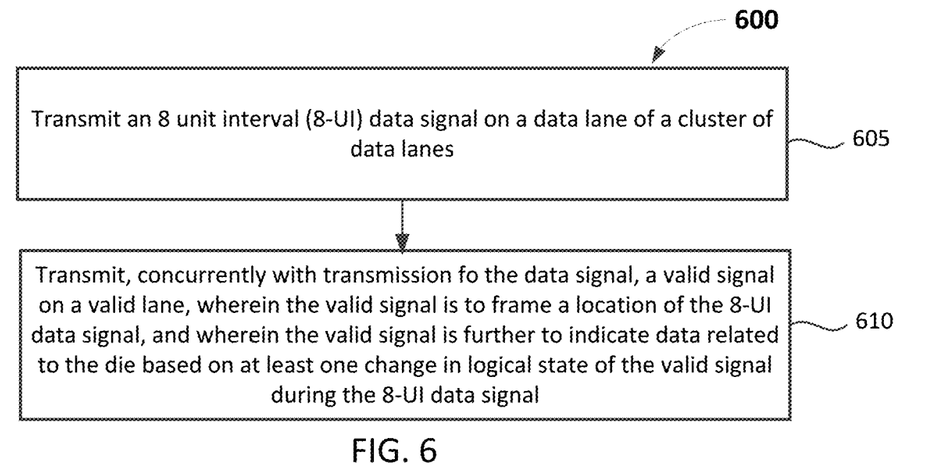
FIG. 6 illustrates an example process related to a D2D interconnect, in accordance with various embodiments.

FIG. 6 illustrates an example process 600 related to a D2D interconnect, in accordance with various embodiments. The process 600 may be performed, for example, by the system 800 (e.g., computing device). More specifically, the process 600 may be performed, for example, by PHY logic (e.g., PHY logic 235 and, more particularly, PHY logic of a retimer such as one of retimers 220a or 220b) of a multi-die package such as one of multi-die packages 100a, 100b, 100c, 205a, 205b, etc. As has been previously noted, the packages may include the PHY logic and PHY electrical circuitry such as mainband PHY layer circuitry 245. The PHY electrical circuitry may be configured to transmit data over a die-to-die (D2D) interconnect link such as the interconnect link described with respect to the mainband 225 and the sideband 230. As previously noted, the mainband may include a differential clock lane, a valid lane, and a cluster of data lanes.

The process 600 may include transmitting, at 605 via the PHY electrical circuitry, an 8-unit interval (8-UI) data signal on a data lane of the cluster of data lanes. Such a data signal may be, for example, the data signal 320 on data lane 315, as described above.

The process 600 may further include transmitting, at 610 via the PHY electrical circuitry concurrently with transmission of the data signal, a valid signal on the valid lane. Such a valid signal may be, for example, the valid signal depicted on valid lane 310 as described above. As has been previously noted, the valid signal may be used to frame a location of the 8-UI data signal. Additionally or alternatively, the valid signal may indicate data related to the die based on at least one change in logical state of the valid signal during the 8-UI data signal. For example, as was previously noted, based on the change in logical state of the valid signal may indicate data related to a retimer such as one of retimers 220a/220b. Other changes in logical state of the valid signal may be used to indicate data such as was previously described with respect to Tables 1 or 2, above.

Figure 7:
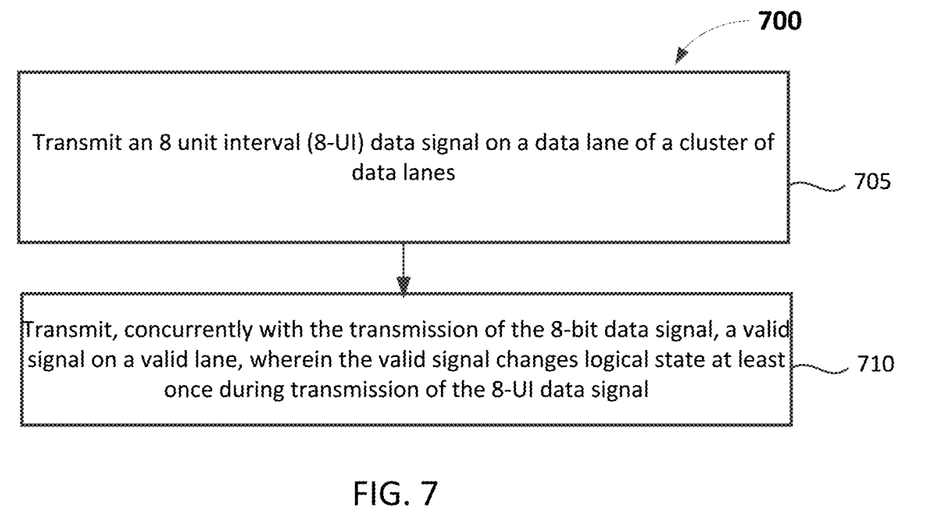
FIG. 7 illustrates an alternative example process related to a D2D interconnect, in accordance with various embodiments.

FIG. 7 illustrates an alternative example process 700 related to a D2D interconnect, in accordance with various embodiments. The process 600 may be performed, for example, by the system 800 (e.g., computing device). More specifically, the process 600 may be performed, for example, by PHY logic (e.g., PHY logic 235 and, particularly, PHY logic of a retimer such as one of retimers 220a or 220b) of a multi-die package such as one of multi-die packages 100a, 100b, 100c, 205a, 205b, etc. As has been previously noted, the packages may include the PHY logic and PHY electrical circuitry such as mainband PHY layer circuitry 245. The PHY electrical circuitry may be configured to transmit data over a die-to-die (D2D) interconnect link such as the interconnect link described with respect to the mainband 225 and the sideband 230. As previously noted, the mainband may include a differential clock lane, a valid lane, and a cluster of data lanes.

The process 700 may include transmitting, at 705, and 8-unit interval (8-UI) data signal on a data lane of a cluster of data lanes. Such a data signal may be, for example, the data signal 320 on data lane 315, as described above.

The process 700 may further include transmitting, at 710 concurrently with the transmission of the 8-bit data signal, a valid signal on a valid lane. Such a valid signal may be, for example, the valid signal depicted on valid lane 310 as described above. As previously noted, for example with respect to Tables 1 or 2, or FIGS. 3-5, the valid signal may change logical state at least once during transmission of the 8-UI data signal.

It should be understood that the actions described in reference to FIGS. 6 and 7 may not necessarily occur in the described sequence. For example, certain elements may occur in an order different than that described, concurrently with one another, etc. In some embodiments, the processes 600 or 700 may include more or fewer elements than depicted or described. It will also be understood that, although processes 600 and 700 are described with reference to FIG. 3, such description may be equally applicable to one or more of FIGS. 4 and 5, or some other embodiment herein.

Figure 8:
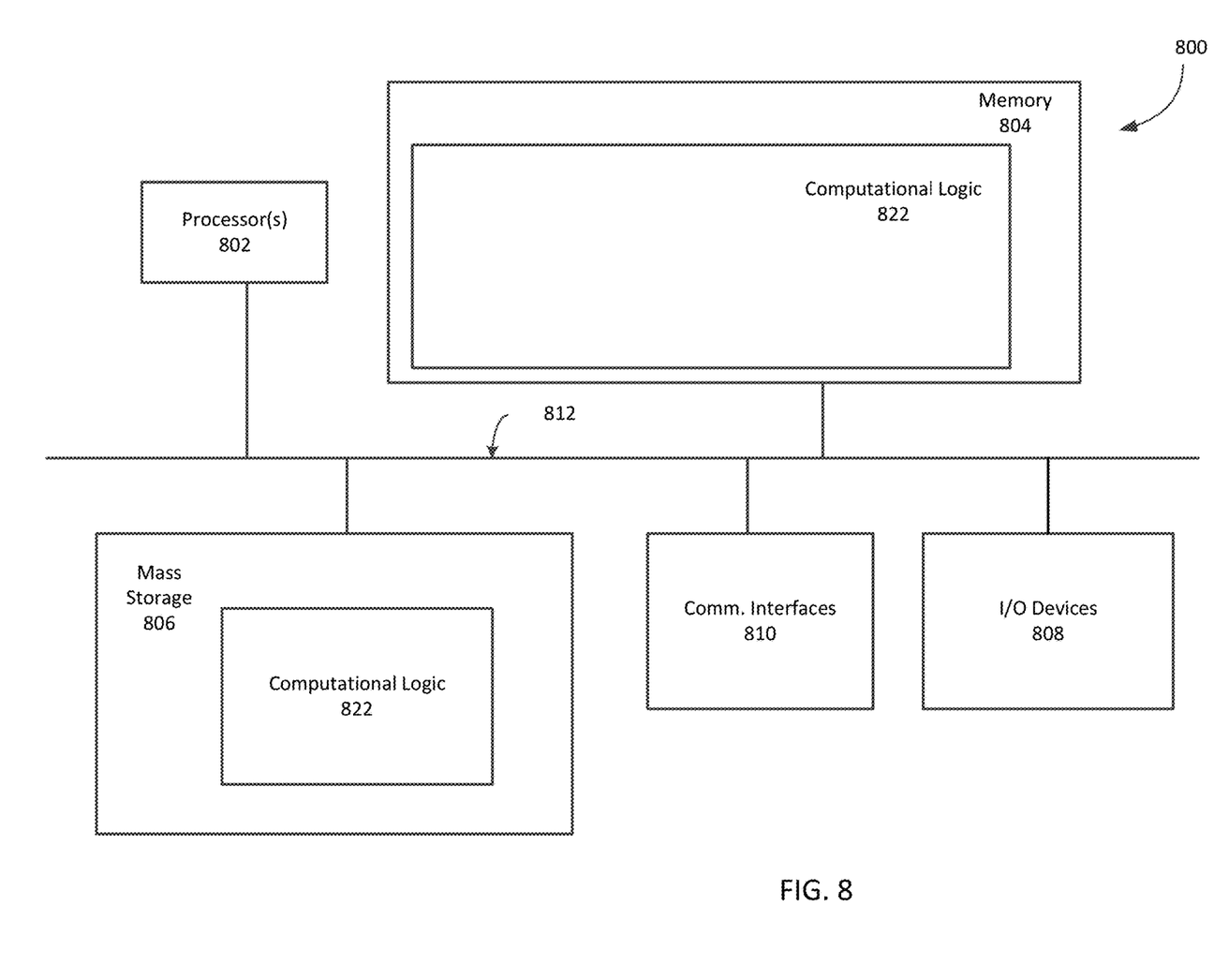
FIG. 8 illustrates an example computing system suitable for practicing various aspects of the disclosure, in accordance with various embodiments.

FIG. 8 illustrates an example computing device 800 suitable for use to practice aspects of the present disclosure, in accordance with various embodiments. For example, the example computing device 800 may be suitable to implement the functionalities associated with one or more of FIGS. 1-7, and/or some other Figure, functionality, or embodiment described herein.

As shown, computing device 800 may include one or more processors 802, each having one or more processor cores, and system memory 804. The processor 802 may include any type of unicore or multi-core processors. Each processor core may include a central processing unit (CPU), and one or more level of caches. The processor 802 may be implemented as an integrated circuit. The computing device 800 may include mass storage devices 806 (such as diskette, hard drive, volatile memory (e.g., dynamic random access memory (DRAM)), compact disc read only memory (CD-ROM), digital versatile disk (DVD) and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but not be limited to, static and/or dynamic random access memory. Non-volatile memory may include, but not be limited to, electrically erasable programmable read only memory, phase change memory, resistive memory, and so forth.

In some embodiments, various of the processor(s) 802, and/or some other element (e.g., a memory 804) may be implemented as dies in a multi-die package such as one of the packages describes with respect to FIGS. 1a-1c or FIG. 2.

The computing device 800 may further include input/output (I/O) devices 808 such as a display, keyboard, cursor control, remote control, gaming controller, image capture device, one or more three-dimensional cameras used to capture images, and so forth, and communication interfaces 810 (such as network interface cards, modems, infrared receivers, radio receivers (e.g., Bluetooth), and so forth). I/O devices 808 may be suitable for communicative connections with three-dimensional cameras or user devices. In some embodiments, I/O devices 808 when used as user devices may include a device necessary for implementing the functionalities of receiving an image captured by a camera.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations and functionalities associated with FIGS. 1-7 and/or some other Figure, functionality, or embodiment described herein, generally shown as computational logic 822. Computational logic 822 may be implemented by assembler instructions supported by processor(s) 802 or high-level languages that may be compiled into such instructions.

The permanent copy of the programming instructions may be placed into mass storage devices 806 in the factory, or in the field, though, for example, a distribution medium (not shown), such as a compact disc (CD), or through communication interfaces 810 (from a distribution server (not shown)).

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

EXAMPLES

Example 1 includes a method to be performed by one or more processors of an electronic device, the method comprising: identifying, by the one or more processors, a valid signal used to frame transmitted data on an interconnect link of the electronic device; monitoring, by the one or more processors, the valid signal to identify one or more parameters of the valid signal; and detecting, by the one or more processors based on a parameter of the valid signal, whether an error in the valid signal exists.

Example 2 includes the method of example 1, and/or some other example herein, wherein the data transfer includes a first 8-bit data packet related to a first flit mode and a second 8-bit data packet related to a second flit mode.

Example 3 includes the method of any of examples 1-2, and/or some other example herein, wherein the link is a chiplet express interconnect (CXi) link.

Example 4 includes the method of any of examples 1-3, and/or some other example herein, wherein monitoring the valid signal includes monitoring the valid signal over an 8-UI boundary.

Example 5 includes the method of any of examples 1-4, and/or some other example herein, wherein a parameter of the valid signal is whether the valid signal is operating in a basic mode or an enhanced mode.

Example 6 includes the method of example 5, and/or some other example herein, wherein if the valid signal is operating in basic mode, the valid signal is asserted for 4 UI and de-asserted for 4 UI.

Example 7 includes the method of example 5, and/or some other example herein, wherein detecting whether the error in the valid signal exists includes detecting whether the valid signal has a transition from a 0 state to a 1 state at every 8-UI boundary.

Example 8 includes the method of example 5, and/or some other example herein, wherein if the valid signal is operating in the basic mode, detecting whether the error in the valid signal exists includes detecting a number of UIs that are in a 1-state in every 8-UI boundary.

Example 9 includes the method of example 5, and/or some other example herein, wherein if the valid signal is operating in the enhanced mode, detecting whether the error in the valid signal exists includes detecting a number of UIs that are in a 1-state and a number of UIs that are in a 0-state in every 8-UI boundary.

Example 10 includes the method of example 5, and/or some other example herein, wherein if the valid signal is operating in the enhanced mode, the valid signal is overloaded with additional information.

Example 11 includes the method of example 10, wherein the additional information is related to error acknowledgement/negative acknowledgement (ACK/NACK), power management entry or exit, or some other latency-sensitive message.

Example 12 includes the method of example 5, and/or some other example herein, wherein whether the valid signal is operating in the basic mode or the enhanced mode is based on the number of required encodings.

Example 13 includes the method of example 5, and/or some other example herein, wherein whether the valid signal is operating in the basic mode or the enhanced mode is based on a Hamming distance.

Example 14 includes a die for use in a multi-die package, wherein the die comprises physical layer (PHY) electrical circuitry to transmit data over a die-to-die (D2D) interconnect link, wherein the interconnect link includes a sideband and a mainband, and wherein the mainband includes a differential clock lane, a valid lane, and a cluster of data lanes; and PHY logic coupled to the PHY electrical circuitry, the PHY logic to: transmit, via the PHY electrical circuitry, an 8 unit interval (8-UI) data signal on a data lane of the cluster of data lanes; and transmit, via the PHY electrical circuitry concurrently with transmission of the data signal, a valid signal on the valid lane, wherein the valid signal is to frame a location of the 8-UI data signal, and wherein the valid signal is further to indicate data related to the die based on at least one change in logical state of the valid signal during the 8-UI data signal.

Example 15 includes the die of example 14, and/or some other example herein, wherein the valid signal is at a first logical state during transmission of one UI of the 8-UI signal, and the valid signal is at a second logical state during transmission of a another UI of the 8-UI signal.

Example 16 includes the die of example 15, and/or some other example herein, wherein the first logical state is a logical "1" and the second logical state is a logical "0."

Example 17 includes the die of example 15, and/or some other example herein, wherein the first logical state is a logical "0" state and the second logical state is a logical "1."

Example 18 includes the die of any of examples 14-17, and/or some other example herein, wherein the cluster of data lanes includes 16 or 64 data lanes.

Example 19 includes the die of any of examples 14-18, and/or some other example herein, wherein the data related to the die includes an indication of error detection related to data received by the die.

Example 20 includes the die of any of examples 14-19, and/or some other example herein, wherein the data related to the die includes an indication of a credit release by the die.

Example 21 includes the die of any of examples 14-20, and/or some other example herein, wherein the die is a retimer.

Example 22 includes the die of example 21, and/or some other example herein, wherein the retimer is to communicatively couple with a second die of the multi-die package via a first protocol, and the retimer is to communicatively coupled with a third die of a different package via a second protocol.

Example 23 includes a die for use in a multi-die package, wherein the die comprises physical layer (PHY) electrical circuitry to transmit data over a die-to-die (D2D) interconnect link, wherein the interconnect link includes a sideband and a mainband, and wherein the mainband includes a differential clock lane, a valid lane, and a cluster of data lanes; and PHY logic coupled to the PHY electrical circuitry, the PHY logic to: transmit, via the PHY electrical circuitry, an 8 unit interval (8-UI) data signal on a data lane of the cluster of data lanes; and transmit, via the PHY electrical circuitry concurrently with the transmission of the 8-bit data signal, a valid signal on the valid lane, wherein the valid signal changes logical state at least once during transmission of the 8-UI data signal.

Example 24 includes the die of example 23, and/or some other example herein, wherein the valid signal is in a logical "1" state for four UIs of the 8-UI data signal period, and the valid signal is in a logical "0" state for another four UIs of the 8-UI data signal period.

Example 25 includes the die of any of examples 23-24, and/or some other example herein, wherein the valid signal is in the logical "1" state for the first four UIs of the 8-UI data signal period, and the valid signal is in the logical "0" state for a second four UIs of the 8-UI data signal period.

Example 26 includes the die of any of examples 23-24, and/or some other example herein, wherein the valid signal is in the logical "1" state for the first, second, fifth, and sixth UIs of the 8-UI data signal period, and the valid signal is in the logical "0" state for the third, fourth, seventh, and eighth UIs of the 8-UI data signal period.

Example 27 includes the die of any of examples 23-26, and/or some other example herein, wherein a change in logical state is based on data related to the die that is being carried by the valid signal.

Example 28 includes the die of example 27, and/or some other example herein, wherein the data related to the die includes an indication of error detection related to data received by the die.

Example 29 includes the die of example 27, and/or some other example herein, wherein the data related to the die includes an indication of a credit release by the die.

Example 30 includes the die of any of examples 23-29, and/or some other example herein, wherein the valid signal is to frame a location of the 8-UI data signal based on a change in logical state of the valid signal during or after transmission of an eighth UI of the 8-UI data signal.

Example 31 includes the die of any of examples 23-30, and/or some other example herein, wherein the cluster of data lanes includes 16 or 64 data lanes.

Example 32 includes the die of any of examples 23-31, and/or some other example herein, wherein the die is a retimer.

Example 33 includes the die of example 32, and/or some other example herein, wherein the retimer is to communicatively couple with a second die of the multi-die package via a first protocol, and the retimer is to communicatively coupled with a third die of a different package via a second protocol.

Example 34 includes a method to be performed by a die of a multi-die package, wherein the method comprises: transmitting an 8 unit interval (8-UI) data signal on a data lane of a cluster of data lanes of a die-to-die (D2D) interconnect link, wherein the interconnect link includes a sideband and a mainband, and wherein the mainband includes a differential clock lane, a valid lane, and the cluster of data lanes; and transmitting, concurrently with transmission of the data signal, a valid signal on the valid lane, wherein the valid signal is to frame a location of the 8-UI data signal based on a first change in logical state of the valid signal during or after transmission of a last UI of the 8-UI data signal, and wherein the valid signal is further to indicate data related to the die based on a second change in logical state of the valid signal after or during transmission of a fourth UI of the 8-UI data signal.

Example Z01 may include an apparatus comprising means to perform one or more elements of a method described in or related to any of examples herein, or any other method or process described herein.

Example Z02 may include an apparatus comprising logic, modules, or circuitry to perform one or more elements of a method described in or related to any of examples 1-34 herein, or any other method or process described herein.

Example Z03 may include a method, technique, or process as described in or related to any of examples 1-34 herein, or portions or parts thereof.

Example Z04 may include a signal as described in or related to any of examples 1-34 herein, or portions or parts thereof.

The invention claimed is:

1. A die for use in a multi-die package, wherein the die comprises:
   physical layer (PHY) electrical circuitry to transmit data over a die-to-die (D2D) interconnect link, wherein the interconnect link includes a sideband and a mainband, and wherein the mainband includes a differential clock lane, a valid lane, and a cluster of data lanes; and PHY logic coupled to the PHY electrical circuitry, the PHY logic to:

transmit, via the PHY electrical circuitry, an 8 unit interval (8-UI) data signal on a data lane of the cluster of data lanes; and transmit, via the PHY electrical circuitry concurrently with transmission of the data signal, a valid signal on the valid lane, wherein the valid signal is to frame a location of the 8-UI data signal, and wherein the valid signal is further to indicate data related to the die based on at least one change in logical state of the valid signal during the 8-UI data signal.

2. The die of claim 1, wherein the valid signal is at a first logical state during transmission of one UI of the 8-UI signal, and the valid signal is at a second logical state during transmission of another UI of the 8-UI signal.

3. The die of claim 2, wherein the first logical state is a logical "1" and the second logical state is a logical "0".

4. The die of claim 2, wherein the first logical state is a logical "0" state and the second logical state is a logical "1".

5. The die of claim 1, wherein the cluster of data lanes includes 16 or 64 data lanes.

6. The die of claim 1, wherein the data related to the die includes an indication of error detection related to data received by the die.

7. The die of claim 1, wherein the data related to the die includes an indication of a credit release by the die.

8. The die of claim 1, wherein the die is a retimer.

9. The die of claim 8, wherein the retimer is to communicatively couple with a second die of the multi-die package via a first protocol, and the retimer is to communicatively coupled with a third die of a different package via a second protocol.

10. A die for use in a multi-die package, wherein the die comprises:

physical layer (PHY) electrical circuitry to transmit data over a die-to-die (D2D) interconnect link, wherein the interconnect link includes a sideband and a mainband, and wherein the mainband includes a differential clock lane, a valid lane, and a cluster of data lanes; and PHY logic coupled to the PHY electrical circuitry, the PHY logic to:

transmit, via the PHY electrical circuitry, an 8 unit interval (8-UI) data signal on a data lane of the cluster of data lanes; and transmit, via the PHY electrical circuitry concurrently with the transmission of the UI data signal, a valid signal on the valid lane, wherein the valid signal changes logical state at least once during transmission of the 8-UI data signal.

11. The die of claim 10, wherein the valid signal is in a logical "1" state for four UIs of the 8-UI data signal, and the valid signal is in a logical "0" state for another four UIs of the 8-UI data signal.

12. The die of claim 11, wherein the valid signal is in the logical "1" state for the first four UIs of the 8-UI data signal, and the valid signal is in the logical "0" state for a second four UIs of the 8-UI data signal.

13. The die of claim 11, wherein the valid signal is in the logical "1" state for a first, second, fifth, and sixth UIs of the 8-UI data signal, and the valid signal is in the logical "0" state for a third, fourth, seventh, and eighth UIs of the 8-UI data signal.

14. The die of claim 10, wherein a change in logical state is based on data related to the die that is being carried by the valid signal.

15. The die of claim 14, wherein the data related to the die includes an indication of error detection related to data received by the die.

16. The die of claim 14, wherein the data related to the die includes an indication of a credit release by the die.

17. The die of claim 10, wherein the valid signal is to frame a location of the 8-UI data signal based on a change in logical state of the valid signal during or after transmission of an eighth UI of the 8-UI data signal.

18. The die of claim 10, wherein the cluster of data lanes includes 16 or 64 data lanes.

19. The die of claim 10, wherein the die is a retimer.

20. The die of claim 19, wherein the retimer is to communicatively couple with a second die of the multi-die package via a first protocol, and the retimer is to communicatively coupled with a third die of a different package via a second protocol.

21. A method to be performed by a die of a multi-die package, wherein the method comprises:

transmitting an 8 unit interval (8-UI) data signal on a data lane of a cluster of data lanes of a die-to-die (D2D) interconnect link, wherein the interconnect link includes a sideband and a mainband, and wherein the mainband includes a differential clock lane, a valid lane, and the cluster of data lanes; and transmitting, concurrently with transmission of the data signal, a valid signal on the valid lane, wherein the valid signal is to frame a location of the 8-UI data signal based on a first change in logical state of the valid signal during or after transmission of a last UI of the 8-UI data signal, and wherein the valid signal is further to indicate data related to the die based on a second change in logical state of the valid signal after or during transmission of a fourth UI of the 8-UI data signal.

* * * * *